United States Patent
Cadarette et al.

(10) Patent No.: US 9,898,343 B2
(45) Date of Patent: *Feb. 20, 2018

(54) APPLICATION-LEVEL DISPATCHER CONTROL OF APPLICATION-LEVEL PSEUDO THREADS AND OPERATING SYSTEM THREADS

(71) Applicant: International Business Machines Corporation, Armonk, NY (US)

(72) Inventors: Paul M. Cadarette, Hemet, CA (US); Robert D. Love, Littleton, NC (US); Austin J. Willoughby, Voorheesville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,856

(22) Filed: Apr. 19, 2016

(65) Prior Publication Data

US 2016/0232038 A1     Aug. 11, 2016

Related U.S. Application Data

(63) Continuation of application No. 14/509,613, filed on Oct. 8, 2014, now Pat. No. 9,348,644.

(51) Int. Cl.
*G06F 9/46*     (2006.01)
*G06F 9/50*     (2006.01)
*G06F 9/48*     (2006.01)

(52) U.S. Cl.
CPC .......... *G06F 9/5055* (2013.01); *G06F 9/4881* (2013.01); *G06F 9/505* (2013.01); *G06F 2209/483* (2013.01); *G06F 2209/5011* (2013.01); *G06F 2209/5018* (2013.01)

(58) Field of Classification Search
USPC ............................................. 718/1, 100–105
See application file for complete search history.

(56) References Cited

U.S. PATENT DOCUMENTS

| | | | |
|---|---|---|---|
| 5,515,538 A | 5/1996 | Kleiman | |
| 5,630,128 A * | 5/1997 | Farrell | G06F 9/4881 718/103 |
| 5,826,081 A | 10/1998 | Zolnowsky | |
| 6,343,309 B1 | 1/2002 | Clarke et al. | |
| 6,360,279 B1 * | 3/2002 | Woods | G06F 9/542 719/318 |

(Continued)

OTHER PUBLICATIONS

Millstein et al, "Expressive and Modular Predicate Dispatch for Java ", ACM Transactions on Programming Languages and Systems, vol. 31, No. 2, Article 7, pp. 1-54, 2009.*

(Continued)

*Primary Examiner* — Anil Khatri
(74) *Attorney, Agent, or Firm* — Lee Law, PLLC; Christopher B. Lee

(57) ABSTRACT

An application-level thread dispatcher that operates in a main full-weight thread allocated to an application is established. The application-level thread dispatcher initializes a group of application-level pseudo threads that operate as application-controlled threads within the main full-weight thread allocated to the application. The application-level thread dispatcher evaluates run-time performance of the application.

20 Claims, 4 Drawing Sheets

(56) References Cited

U.S. PATENT DOCUMENTS

| | | | | |
|---|---|---|---|---|
| 6,434,590 | B1* | 8/2002 | Blelloch | G06F 9/5066 718/102 |
| 6,460,767 | B1* | 10/2002 | Knowles | A47F 9/046 235/462.36 |
| 6,697,935 | B1 | 2/2004 | Borkenhagen et al. | |
| 7,039,911 | B2 | 5/2006 | Chase et al. | |
| 7,096,469 | B1* | 8/2006 | Kubala | G06F 9/5077 718/100 |
| 7,159,216 | B2* | 1/2007 | McDonald | G06F 9/4881 718/100 |
| 7,398,521 | B2 | 7/2008 | Hoflehner et al. | |
| 7,574,708 | B2* | 8/2009 | Chung | G06F 9/505 718/104 |
| 7,614,054 | B2* | 11/2009 | Jiang | G06F 9/4843 718/102 |
| 7,685,599 | B2 | 3/2010 | Kanai et al. | |
| 7,752,627 | B2 | 7/2010 | Jones et al. | |
| 7,895,597 | B2 | 2/2011 | Hartikainen | |
| 7,904,907 | B2 | 3/2011 | Jiang et al. | |
| 7,917,907 | B2* | 3/2011 | Ahmed | G06F 9/3851 712/34 |
| 7,975,272 | B2 | 7/2011 | Jiang et al. | |
| 8,122,451 | B2* | 2/2012 | McDonald | G06F 9/4881 711/173 |
| 8,205,206 | B2* | 6/2012 | Ozer | G06F 9/3851 711/130 |
| 8,219,995 | B2* | 7/2012 | Flemming | G06F 9/45541 718/104 |
| 8,276,143 | B2 | 9/2012 | Vengerov et al. | |
| 8,347,301 | B2 | 1/2013 | Li et al. | |
| 8,387,066 | B1* | 2/2013 | Becher | G06F 9/4881 709/223 |
| 8,522,244 | B2* | 8/2013 | Chung | G06F 13/1663 711/100 |
| 8,683,476 | B2 | 3/2014 | Saxe et al. | |
| 8,799,904 | B2* | 8/2014 | Kuiper | G06F 13/24 717/127 |
| 8,813,082 | B2 | 8/2014 | Barsness et al. | |
| 8,832,693 | B2* | 9/2014 | Mandre | G06F 9/45558 709/201 |
| 8,881,157 | B2* | 11/2014 | Wolfe | G06F 9/505 718/102 |
| 8,954,969 | B2* | 2/2015 | Ries | G06F 9/5033 718/102 |
| 8,966,494 | B2* | 2/2015 | Makljenovic | G06F 9/526 710/200 |
| 9,021,495 | B2 | 4/2015 | Busaba et al. | |

OTHER PUBLICATIONS

Zaleski et al, "Mixed Mode Execution with Context Threading", ACM, pp. 1-15, 2005.*

Naik et al, "Efficient Message Dispatch in Object-Oriented Systems", ACM, pp. 49-58, 2000.*

Millstein et al, "Expressive and Modular Predicate Dispatch for Java", ACM Transactions on Programming Languages and Systems, vol. 31, No. 2, Article 7, pp. 1-54, 2009.*

Zalseki et al, "Mixed Mode Execution with Context Threading", ACM, pp. 1-15, 2005.*

Wilikinson et al, "Thread and Execution-Context Specific Barriers via Dynamic Method Versioning", ACM, pp. 48-54, 2009.*

Berndl et al, "Context Threading: A flexible and efficient dispatch technique for virtual machine interpreters", IEEE, pp. 1-12, 2005.*

Tu et al, "A Portable and Efficient User Dispatching Mechanism for Multicore Systems", IEEE, pp. 427-436, 2009.*

Xekalakis, Polychronis, et al., Combining Thread Level Speculation, Helper Threads, and Runahead Execution, Proceedings of the 23rd International Conference on Supercomputing, Jun. 8, 2009, pp. 410-420, Association for Computing Machinery, Yorktown Heights, NY, USA.

United States Patent and Trademark Office, Office Action for U.S. Appl. No. 14/509,613, dated Oct. 8, 2015, pp. 1-17, Alexandria, VA, USA.

United States Patent and Trademark Office, Notice of Allowance for U.S. Appl. No. 14/509,613, dated Mar. 2, 2016, pp. 1-15, Alexandria, VA, USA.

IBM, List of IBM Patents or Patent Applications Treated as Related, Applicant Appendix, Apr. 19, 2016, pp. 1-2, the contents of which are incorporated herein by reference in their entirety.

Vimal K. Reddy, et al., Understanding Prediction-Based Partial Redundant Threading for Low-Overhead, High-Coverage Fault Tolerance, In Proceedings of the 12th International Conference on Architectural Support for Programming Languages and Operating Systems, Oct. 21, 2006, pp. 83-94, Association for Computing Machinery, New York, NY, USA.

Yoongu Kim, et al., Thread Cluster Memory Scheduling: Exploiting Differences in Memory Access Behavior, In Proceedings of the 2010 43rd Annual IEEE/ACM International Symposium on Microarchitecture, Dec. 4, 2010, pp. 65-76, IEEE Computing Society, Washington, DC, USA.

Yangchun Luo, et al., Dynamically Dispatching Speculative Threads to Improve Sequential Execution, ACM Transactions on Architecture and Code Optimization, vol. 9, No. 3, Article 13, Sep. 2012, pp. 1-31, Association for Computing Machinery, New York, NY, USA.

Takeshi Kodaka, et al., Design and Implementation of Scalable, Transparent Threads for Multi-Core Media Processor, In Proceedings of the Conference on Design, Automation and Test in Europe, Apr. 20, 2009, pp. 1035-1039, European Design and Automation Association, Belgium.

Jialin Duo, et al., Compiler Estimation of Load Imbalance Overhead in Speculative Parallelization, In Proceedings of the 13th International Conference on Parallel Architectures and Compilation Techniques, Sep. 29, 2004, pp. 203-214, IEEE Computer Society, Washington, DC, USA.

Salikh S. Zakirov, et al., Optimizing Dynamic Dispatch with Fine-grained State Tracking, In Proceedings of the 6th Symposium on Dynamic Languages, Oct. 18, 2010, pp. 15-26, Association for Computing Machinery, New York, NY, USA.

* cited by examiner

US 9,898,343 B2

APPLICATION-LEVEL DISPATCHER CONTROL OF APPLICATION-LEVEL PSEUDO THREADS AND OPERATING SYSTEM THREADS

BACKGROUND

The present invention relates to application process threads. More particularly, the present invention relates to application-level dispatcher control of application-level pseudo threads and operating system threads.

Certain operating systems provide operating system-level "threads" (alternatively native threads) that may be invoked to perform processing of application functionality. The operating system-level threads all execute on a central processing unit (CPU) and share CPU processing cycles under control of the operating system.

SUMMARY

A method includes establishing, by a processor, an application-level thread dispatcher that operates in a main full-weight thread allocated to an application; initializing, by the application-level thread dispatcher, a plurality of application-level pseudo threads that operate as application-controlled threads within the main full-weight thread allocated to the application; and evaluating, by the application-level thread dispatcher, run-time performance of the application.

A system includes a memory, and a processor programmed to: establish an application-level thread dispatcher that operates in a main full-weight thread allocated within the memory to an application; initialize, by the application-level thread dispatcher, a plurality of application-level pseudo threads that operate as application-controlled threads within the main full-weight thread allocated to the application; and evaluate, by the application-level thread dispatcher, run-time performance of the application.

A computer program product includes a computer readable storage medium having computer readable program code embodied therewith, where the computer readable program code when executed on a computer causes the computer to: establish an application-level thread dispatcher that operates in a main full-weight thread allocated to an application; initialize, by the application-level thread dispatcher, a plurality of application-level pseudo threads that operate as application-controlled threads within the main full-weight thread allocated to the application; and evaluate, by the application-level thread dispatcher, run-time performance of the application.

DETAILED DESCRIPTION

Figure 1:
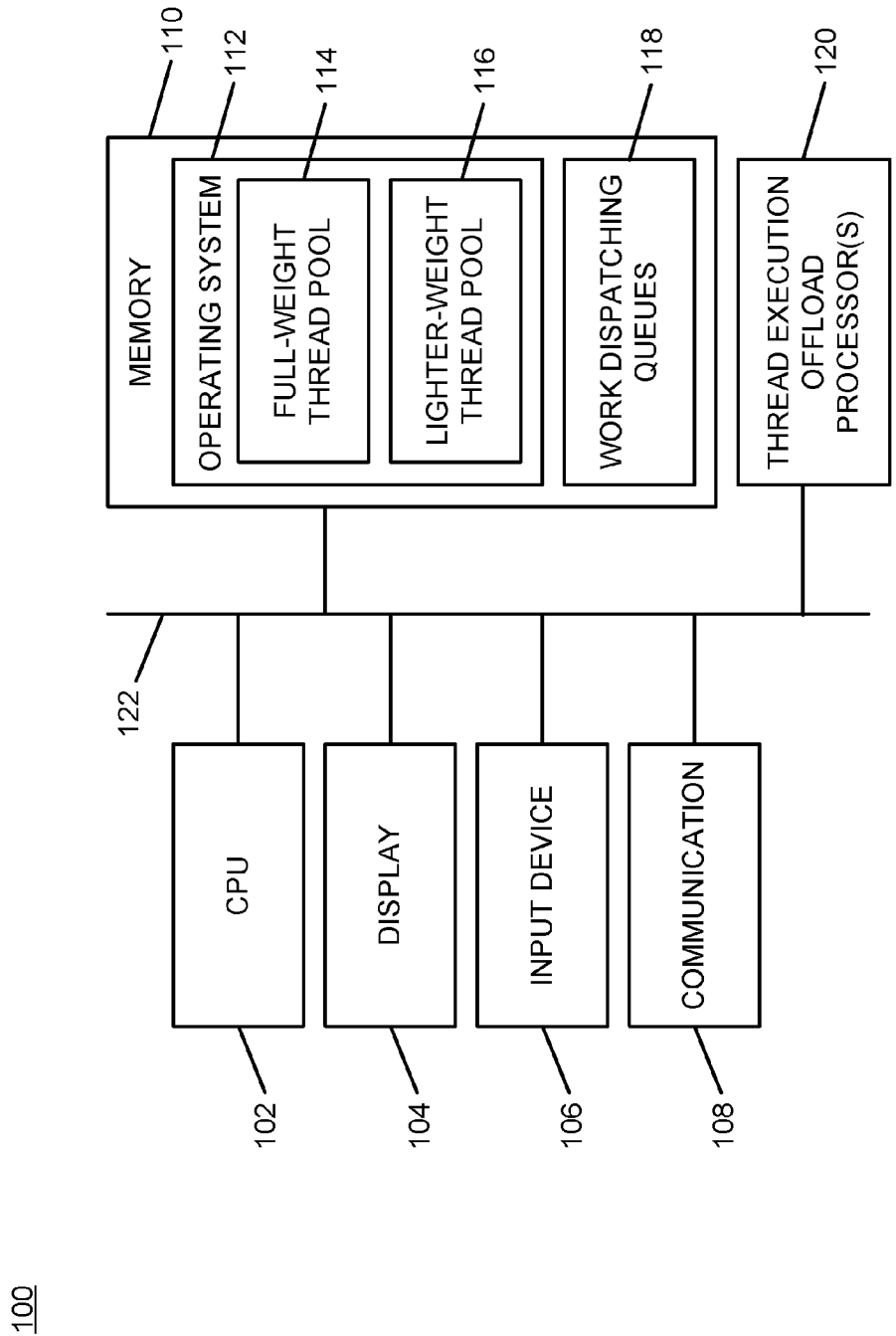
FIG. 1 is a block diagram of an example of an implementation of a core processing module of a computing device that may provide application-level dispatcher control of application-level pseudo threads and operating system threads according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides application-level dispatcher control of application-level pseudo threads and operating system threads. The present technology provides an application-level thread dispatcher that performs several different thread controls. The application-level thread dispatches and dynamically manages three distinct categories of threads: application-level pseudo threads, full-weight operating system-level threads, and lighter-weight operating system-level threads across multiple central processing units (CPUs—"processors"). The application-level thread dispatcher facilitates and manages application-level pseudo threads to avoid increasing operating system-level thread usage while also exploiting multiple CPUs to achieve higher throughputs during burst periods. The application-level thread dispatcher further dynamically adds and/or removes operating system-level threads (full-weight or lighter-weight threads) to offload qualifying work to those added system threads for concurrent processing. As such, the application-level thread dispatcher both manages application-level pseudo threads on a main full-weight operating system-level thread of the application itself, and dispatches qualifying work to dynamically added lighter-weight operating system-level threads and additional full-weight operating system-level threads. Accordingly, the present technology may improve application-level processing throughput while also reducing system costs.

For purposes of the present description, the terms "application-level pseudo thread" and "pseudo thread" are used interchangeably and refer to threads that do not rely upon an operating system for management. Additionally, the terms "operating system-level thread," "system-level thread," and "system thread" are also used interchangeably herein and refer to one of two types of operating system threads based upon the context within which the terms are used. A "full-weight" system thread may be considered a thread that may be used to execute an application with full access to resources sufficient to fully-execute the application within the respective operating system. In contrast, a "lighter-weight" system thread may be considered a thread with limited access to resources relative to a full-weight system thread. Further the terms "application-level thread dispatcher" and "application-level dispatcher" are used interchangeably.

Additionally, for purposes of the present description, the term "thread-safe" represents a form of processing within a shared-resource multi-threaded environment that ensures a safe use of the shared resources that allows multiple threads to run concurrently without causing problems. As such, a thread-safe operation may include locking of resources, control of serialization for accesses to resources, or other processing as appropriate for a given implementation.

It should be noted that an entire application does not need to be thread-safe to use alternative system threads as described herein. Additionally, and in contrast to prior technologies, an application designed as described herein may run on multiple system threads simultaneously.

The present technology may be utilized in a variety of implementations. For example, decompressing data buffers, decrypting data buffers, and reading files represent a few examples of implementations where work may be delegated to a given pseudo thread, to a lighter-weight system thread, and to another full-weight system thread. Delegated work may be queued to respective threads for processing. Many other uses of the present technology are possible and all such uses are considered within the scope of the present description.

Regarding queuing of work to pseudo threads, to lighter-weight system threads, and to other full-weight system threads, the queuing of work may be performed by placing function pointers into work dispatching queues. The function pointers may be utilized by the respective threads to directly invoke an appropriate function referenced by the respective function pointer to perform the delegated work. For such an implementation, it is understood that the function referenced by the respective function pointers would be memory mapped and accessible by the respective threads. While the example of using function pointers and memory mapping is provided, it should be noted that any other form of work delegation may be utilized as appropriate for a given implementation. It should be noted that it may be considered a distinct operation to put work on a queue and another distinct operation to invoke another thread, and that these operations may be controlled by the application-level thread dispatcher.

Further regarding the application-level thread dispatcher, the application-level thread dispatcher operates within the main full-weight system thread in which the application executes and emulates its own threading model that gives each pseudo thread a portion of the overall time the operating system gives to the main full-weight system thread. As such, the pseudo threads are not scheduled by the operating system, but are instead managed at the application level by the application-level thread dispatcher that runs in the main full-weight operating system-level thread of the application. It should be noted that the application-level thread dispatcher creates and schedules the application-level pseudo thread.

Additionally, the application-level thread dispatcher dynamically adds and removes lighter-weight system threads in conjunction with managing the pseudo threading from the full-weight system thread. The lighter-weight system threads may be considered threads of limited resources that operate in a restricted environment, and are distinguishable as such from full-weight system threads. The lighter-weight system threads may be implemented to execute on specialized hardware or on the same platform as the full-weight system threads. Alternatively, the lighter-weight system threads may be implemented as a distinct form of an executional control unit within a particular operating system. For example, on a z/OS® operating system, the lighter-weight system threads may be implemented as Service Request Blocks (SRBs), while the full-weight system threads may be implemented as Task Control Blocks (TCBs). Alternatively, on other operating systems, such as UNIX, threads may be differentiated between heavyweight threads and lightweight threads, and the full-weight and lighter-weight threads described herein may be implemented using the respective heavyweight and lightweight operating system threads. Many other possibilities for distinguishing and implementing the full-weight system threads and lighter-weight system threads are possible, as appropriate for the given implementation, and all such possibilities are considered within the scope of the present technology.

The application-level thread dispatcher may schedule its responsibilities in three primary modes to manage the various threads (e.g., full-weight system thread, pseudo threads, and lighter-weight system threads) based on application design and configuration. The modes of scheduling may be considered granular and managed at a task level for each scheduled responsibility. For example, the application-level thread dispatcher may schedule its responsibilities in a first mode as a pseudo thread running in the same full-weight system thread as the application-level thread dispatcher, may schedule its responsibilities in a second mode as a work item queued to another available full-weight system thread, or may schedule its responsibilities in a third mode as a work item queued to another available lighter-weight system thread.

As such, the pseudo thread may be dispatched to the same full-weight system thread that executes the application-level thread dispatcher or to a different full-weight system thread if the application is configured to utilize one or more other full-weight system threads. Alternatively, the pseudo thread may be dispatched to a lighter-weight system thread that operates on the same CPU or on a different CPU.

It should additionally be noted that full-weight system threads may be organized into a pool/group of full-weight system threads, and as described herein, the pool size may be adjusted within system constraints (e.g., thread availability, other executing applications, etc.). Lighter-weight system threads may also be organized into a pool/group of available lighter-weight system threads, and the pool size may be adjusted within system constraints (e.g., again thread availability, other executing applications, etc.).

With respect to scheduling its responsibilities as a pseudo thread running in the same full-weight system thread as the application-level thread dispatcher, the application-level thread dispatcher manages the pseudo threads to cooperatively yield back to the application-level thread dispatcher when responsibilities are dispatched in this mode. This present technology allows a pseudo thread to offload a segment of its work by creating its own work items, as described in more detail below. The offloading of a segment of work allows a pseudo thread to yield back to the application-level thread dispatcher more quickly by addressing any processing that requires the full-weight system thread (e.g., opening a file), and then offloading the remaining processing (e.g., reading contents of the file) to a lighter-weight system thread to allow this processing to occur in parallel with the full-weight thread that is now able to dispatch another pseudo thread. As described above, and in more detail below, the lighter-weight system thread may be dispatched to a distinct CPU to effect true parallel/concurrent processing.

With respect to scheduling its responsibilities under the second mode or third mode as a work item queued to another available full-weight system thread or to a lighter-weight system thread operating on the same or a different processor, respectively, a work queue may be implemented for each respective system thread to communicate work items that are available for processing by the alternative system threads. Each work item represents an independent piece of work that may be processed asynchronously in a thread-safe manner. It should be noted that it may be considered a distinct operation to put work on a queue and another distinct operation to resume a lighter-weight system thread or invoke a full-weight thread, respectively, and that these operations may be controlled by the application-level thread dispatcher.

With respect to scheduling its responsibilities as a work item queued to another available full-weight system thread under the second mode, the work queue may also be used to communicate work items that are available for processing by the additional full-weight system threads. As described above, full-weight threads may be configured for use by applications and the application-level thread dispatcher. As such, the application-level thread dispatcher may utilize an operating system mechanism to push the task over to another available full-weight system thread, and use work queues for communication of tasks to and outputs from the respective other available full-weight system threads.

Further, with respect to scheduling its responsibilities under the third mode as a work item queued to a lighter-weight system thread operating on the same or a different processor, the application-level thread dispatcher identifies a pseudo thread as conforming to any restrictions related to processing of tasks within the lighter-weight system thread environment. In this scenario, where the entire pseudo thread is defined as eligible to run on a lighter-weight system thread, the application-level thread dispatcher schedules the pseudo thread to execute on a lighter-weight system thread within the respective configured limits of the lighter-weight system thread environment. As such, the application-level thread dispatcher utilizes an operating system mechanism to push the task over to a lighter-weight system thread, and uses work queues for communication of tasks to and outputs from the respective lighter-weight system threads.

As described above, scheduling between pseudo threads and lighter-weight system threads may be based upon a respective pseudo thread's definition regarding whether its processing conforms to the restricted nature of the lighter-weight system thread environment. For example, the application-level thread dispatcher may have knowledge with respect to a particular system that a file cannot be opened by a lighter-weight system thread and that such processing must be performed on the full-weight system thread, potentially as a pseudo thread. The application-level thread dispatcher may dispatch the file opening operation to a pseudo thread and set a flag indicating that the file has been opened. The next time an operation related to the file (e.g., a read or write) is to be performed, the application-level thread dispatcher may evaluate the flag and determine that file is already opened, and may assign the subsequent processing to a lighter-weight system thread. As such, the application-level thread dispatcher may granularly assign tasks based upon the state of the respective system resources and may use flags associated with the resources to route and dispatch processing tasks to appropriate threads (e.g., full-weight, pseudo, and lighter-weight threads, respectively).

It should be noted that conception of the present subject matter resulted from recognition of certain limitations associated with use of operating system-level threads. For example, it was observed that operating system-level threads are limited within any particular operating environment by the constraints of the operating system. Additionally, it was observed that applications may be limited in their ability to partition work by these operating system-level constraints.

In view of these observations, it was determined that a more granular form of thread dispatching performed by an application-level thread dispatcher that partitions application-level processing to application-level pseudo threads described herein may improve application-level task/work processing without requiring operating system-level controls. It was additionally determined from these observations that application-level control of dispatching of operating system-level threads to multiple CPUs may further expand processing capabilities of executing applications. It was further determined that use of technology to employ application-level pseudo threading may avoid the costs of multiple system threads while exploiting multiple processors/CPUs to achieve higher application-level throughputs and may improve application-level processing of tasks during burst periods. It was also determined that, based upon particular states of data processing, the application-level control of thread dispatching to application-level pseudo threads and to operating system-level threads across multiple processors that allows routine adjustment (e.g., promotion) of thread-type assignments may be leveraged to balance and improve the cross-thread dispatching. For example, it was determined that certain operations, such as opening a file may require the work to be assigned to a full-weight operating system-level thread by nature of the operating system design (e.g., either the application-level dispatching thread or another available full-weight thread), whereas processing the contents of an opened file may be processed by an application-level pseudo thread on any available thread, including lighter-weight threads. It was determined that application-level thread dispatching that evaluates a given state of a particular application-level task and that migrates the work over time to different thread types based upon that state may improve efficiency of application-level processing. The present subject matter improves application-level thread processing by providing for thread dispatching between application and operating system levels, and across multiple CPUs, as described above and in more detail below. The present technology provides control capabilities to add capacity during peak periods. The addition of capacity may be dynamically controlled and adjustable through configuration. As such, improved application-level processing may be obtained through use of the present technology.

The application-level dispatcher control of application-level pseudo threads and operating system threads described herein may be performed in real time to allow prompt control and management of both application-level pseudo threads and operating system-level threads across multiple discrete CPUs. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a core processing module 100 of a computing device that may provide application-level dispatcher control of application-level pseudo threads and operating system threads. As described above and in more detail below in association with FIG. 2 through FIG. 4, the core processing module 100 may provide automated application-level dispatcher control of application-level pseudo threads and operating system threads by balancing performance and system constraints using application-level pseudo threads, other full-weight system threads, and lighter-weight system threads that operate on the same or a different processor. The present technology may be implemented at a user computing device or server device level, as appropriate for a given implementation. A variety of possibilities exist for implementation of the present subject matter, and all such possibilities are considered within the scope of the present subject matter.

As described above, the core processing module 100 may be associated with either a user computing device or with a server computing device, as appropriate for a given implementation. Further, different processors may be implemented on different hardware platforms or within the same hardware platform, as appropriate for a given implementation. As such, the core processing module 100 is described generally herein, though it is understood that many variations on implementation of the components within the core processing module 100 are possible and all such variations are within the scope of the present subject matter.

Further, the core processing module 100 may provide different and complementary processing of application-level dispatcher control of application-level pseudo threads and operating system threads in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 102 ("processor") provides hardware that performs computer instruction execution, computation, and other capabilities within the core processing module 100. A display 104 provides visual information to a user of the core processing module 100 and an input device 106 provides input capabilities for the user.

The display 104 may include any display device, such as a cathode ray tube (CRT), liquid crystal display (LCD), light emitting diode (LED), electronic ink displays, projection, touchscreen, or other display element or panel. The input device 106 may include a computer keyboard, a keypad, a mouse, a pen, a joystick, touchscreen, voice command processing unit, or any other type of input device by which the user may interact with and respond to information on the display 104.

It should be noted that the display 104 and the input device 106 may be optional components for the core processing module 100 for certain implementations/devices, or may be located remotely from the respective devices and hosted by another computing device that is in communication with the respective devices. Accordingly, the core processing module 100 may operate as a completely automated embedded device without direct user configurability or feedback. However, the core processing module 100 may also provide user feedback and configurability via the display 104 and the input device 106, respectively, as appropriate for a given implementation.

A communication module 108 provides hardware, protocol stack processing, and interconnection capabilities that allow the core processing module 100 to communicate with other modules via a network or other communications technology. The communication module 108 may include any electrical, protocol, and protocol conversion capabilities useable to provide interconnection capabilities, appropriate for a given implementation.

A memory 110 includes an operating system area 112 that provides storage and execution space for one or more operating systems for the core processing module 100. The operating system area 112 includes a full-weight thread pool 114 and a lighter-weight thread pool 116. As described above, the sizes of the respective thread pools may be pre-configured, and may be dynamically adjusted within system constraints by the application-level thread dispatcher. Further, as also described above, the application-level thread dispatcher operates within one of the full-weight system threads within the full-weight thread pool 114, and as such, the application-level thread dispatcher is not separately illustrated within FIG. 1. The operating system area 112 further provides execution space for one or more applications, and separate storage space for the application(s) may be provided within the memory 110 (not shown).

The memory 110 further includes a work dispatching queues area 118. The work dispatching queues area 118 may be utilized to dynamically create one or more work queues implemented for each respective system thread to communicate work items that are available for processing by the alternative system threads.

It is understood that the memory 110 may include any combination of volatile and non-volatile memory suitable for the intended purpose, distributed or localized as appropriate, and may include other memory segments not illustrated within the present example for ease of illustration purposes. For example, the memory 110 may also include a code storage area and a data area without departure from the scope of the present subject matter.

One or more thread execution offload processor(s) 120 are also illustrated generally as a single element within FIG. 1 for ease of illustration. The thread execution offload processor(s) 120 provide additional execution space for threads within the core processing module 100, as described above and in more detail below. The thread execution offload processor(s) 120 may be utilized, as described above, to offload work from a pseudo thread under circumstances where the pseudo thread operations are compliant with the processing requirements of the thread execution offload processor(s) 120. The thread execution offload processor(s) 120 may include their own memory and operating systems, or may utilize the memory 110 and the operating system area 112, as appropriate for a given implementation.

The CPU 102, the display 104, the input device 106, the communication module 108, the memory 110, and the thread execution offload processor(s) 120 are interconnected via an interconnection 122. The interconnection 122 may include a system bus, a network, or any other interconnection capable of providing the respective components with suitable interconnection for the respective purpose.

Though the different modules illustrated within FIG. 1 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 100 is illustrated with and has certain components described, other modules and components may be associated with the core processing module 100 without departure from the scope of the present subject matter. Additionally, it should be noted that, while the core processing module 100 is described as a single device for ease of illustration purposes, the components within the core processing module 100 may be co-located or distributed and interconnected via a network without departure from the scope of the present subject matter. For a distributed arrangement, the display 104 and the input device 106 may be located at a point of sale device, kiosk, or other location, while the CPU 102 and memory 110 may be located at a local or remote server. Many other possible arrangements for components of the core processing module 100 are possible and all are considered within the scope of the present subject matter. Accordingly, the core processing module 100 may take many forms and may be associated with many platforms.

Figure 2:
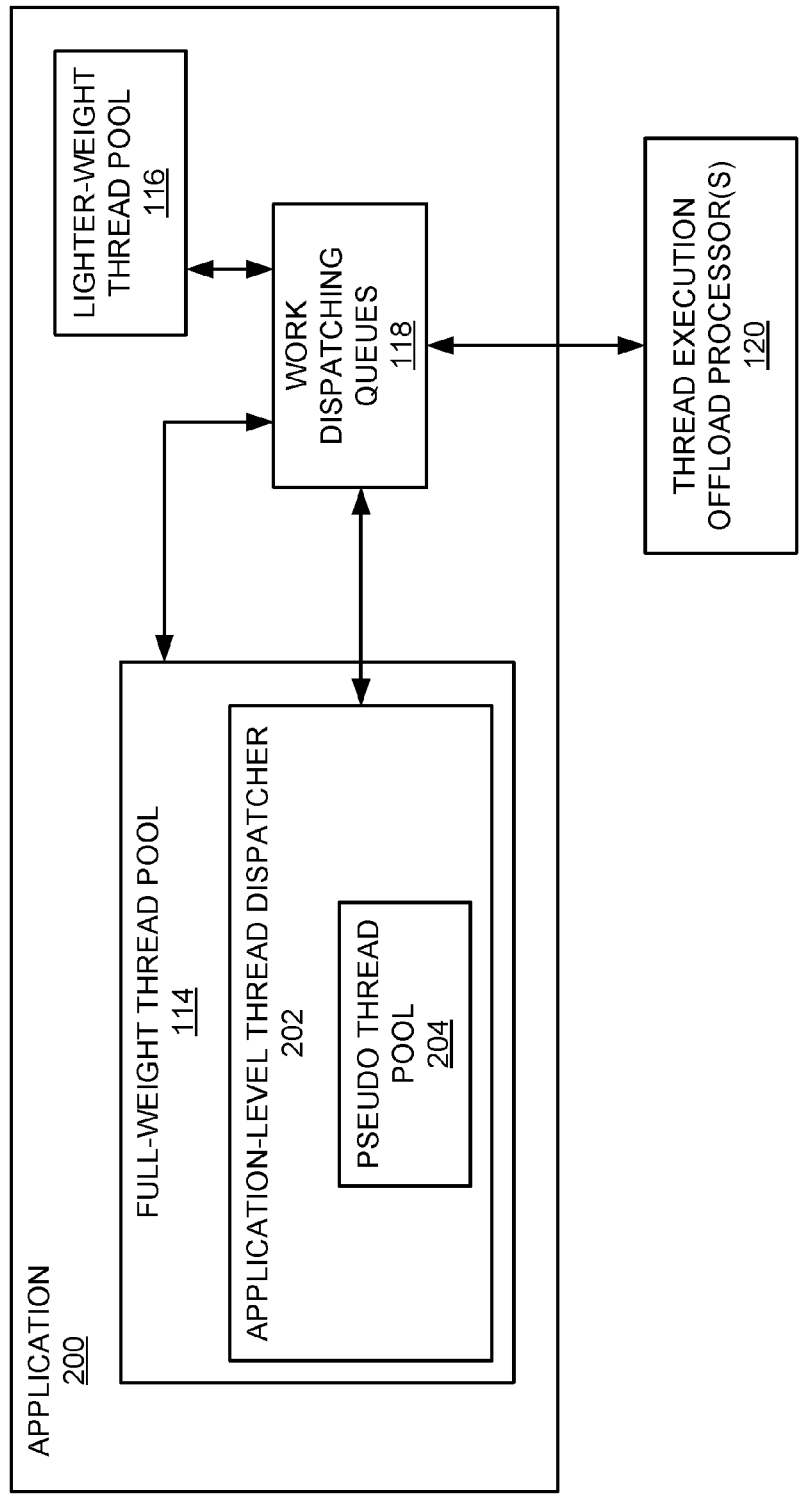
FIG. 2 is a block diagram of an example of an implementation of an application-level thread dispatcher that may perform application-level dispatcher control of application-level pseudo threads and operating system threads according to an embodiment of the present subject matter.

FIG. 2 is a block diagram of an example of an implementation of an application-level thread dispatcher that may perform application-level dispatcher control of application-level pseudo threads and operating system threads. An application 200 is shown to be executing within the memory 110, and is understood to be operating within the operating system area 112.

The full-weight thread pool 114, the lighter-weight thread pool 116, and the work dispatching queues 118 are again illustrated to show an interrelationship between the respective elements. The thread execution offload processor(s) 120 are also illustrated to show the interrelationship with the other depicted components. As can be seen within FIG. 2, the thread execution offload processor(s) 120 operate outside of the thread scope of the application 200.

As described above, applications such as the application 200 may be configured to allow utilization of more than one full-weight thread. As such, the work dispatching queues 118 has a path to one or more other full-weight system threads (not shown) within the full-weight thread pool 114. The work dispatching queues 118 also has a path to one or more other lighter-weight system threads (not shown) within the lighter-weight thread pool 116, and has a path to the thread execution offload processor(s) 120.

An application-level thread dispatcher 202 is illustrated within the full-weight thread pool 114. As also described above, the application-level thread dispatcher 202 executes within the full-weight system thread that executes the application 200.

The application-level thread dispatcher 202 is shown to include and also manage a pseudo thread pool 204. The pseudo thread pool 204 represent an application-level managed threading environment under which the application-level thread dispatcher 202 dispatches portions of work for execution within the full-weight system thread that executes the application 200. As also described above, and in more detail below, pseudo threads may be dispatched by the application-level thread dispatcher 202 to other full-weight system threads, and to other lighter-weight system threads operating on the same CPU or alternatively on one or more of the thread execution offload processor(s) 120.

As described above, the application-level thread dispatcher 202 may dynamically adjust (add and remove) pseudo threads within the pseudo thread pool 204 and may dynamically adjust lighter-weight threads within the lighter-weight thread pool 116 and full-weight threads within the full-weight thread pool 114. Dynamic adjustment of the respective threads within the respective thread pools may be based upon analysis of the run-time performance of the application, such as the application 200, that is managed by the application-level thread dispatcher 202.

Figure 3:
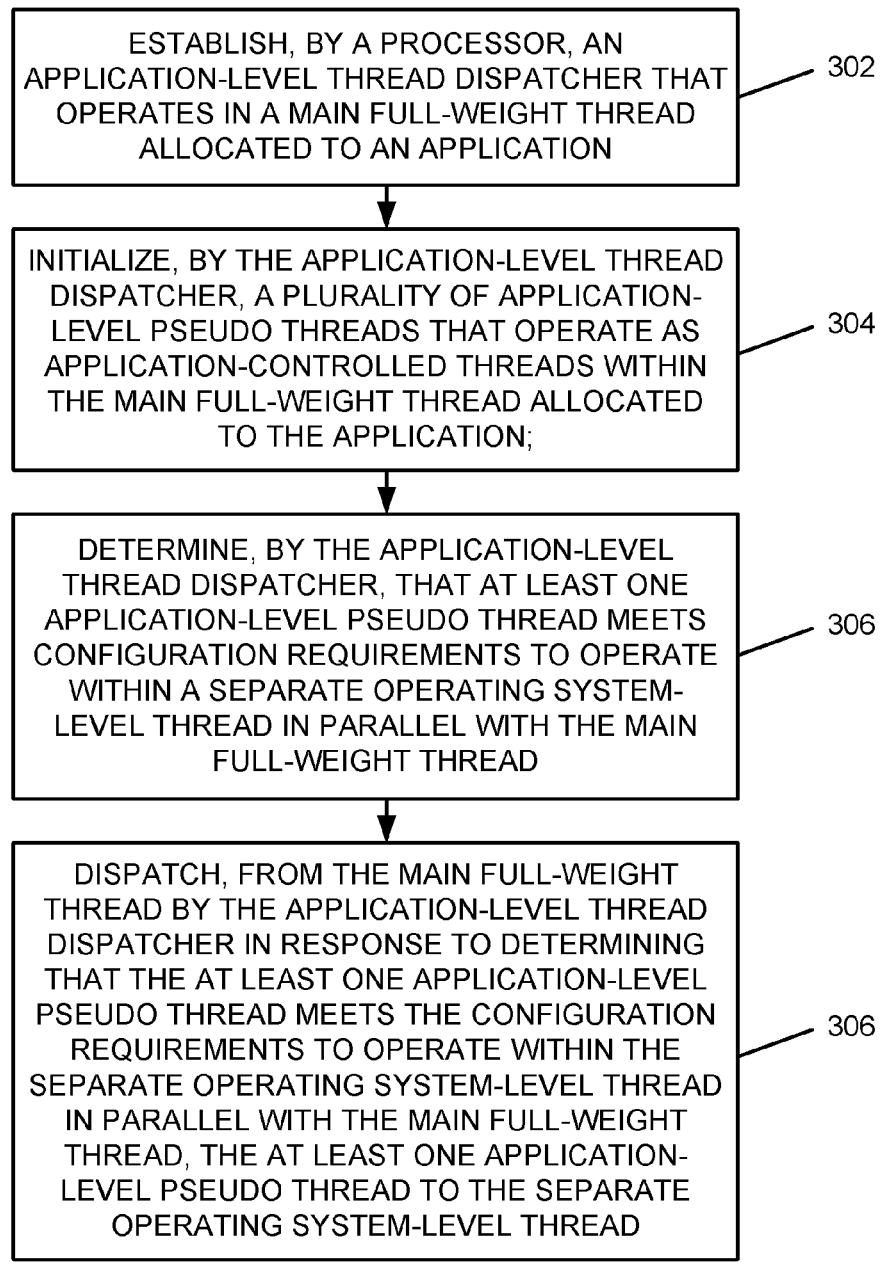
FIG. 3 is a flow chart of an example of an implementation of a process for application-level dispatcher control of application-level pseudo threads and operating system threads according to an embodiment of the present subject matter.
Figure 4:
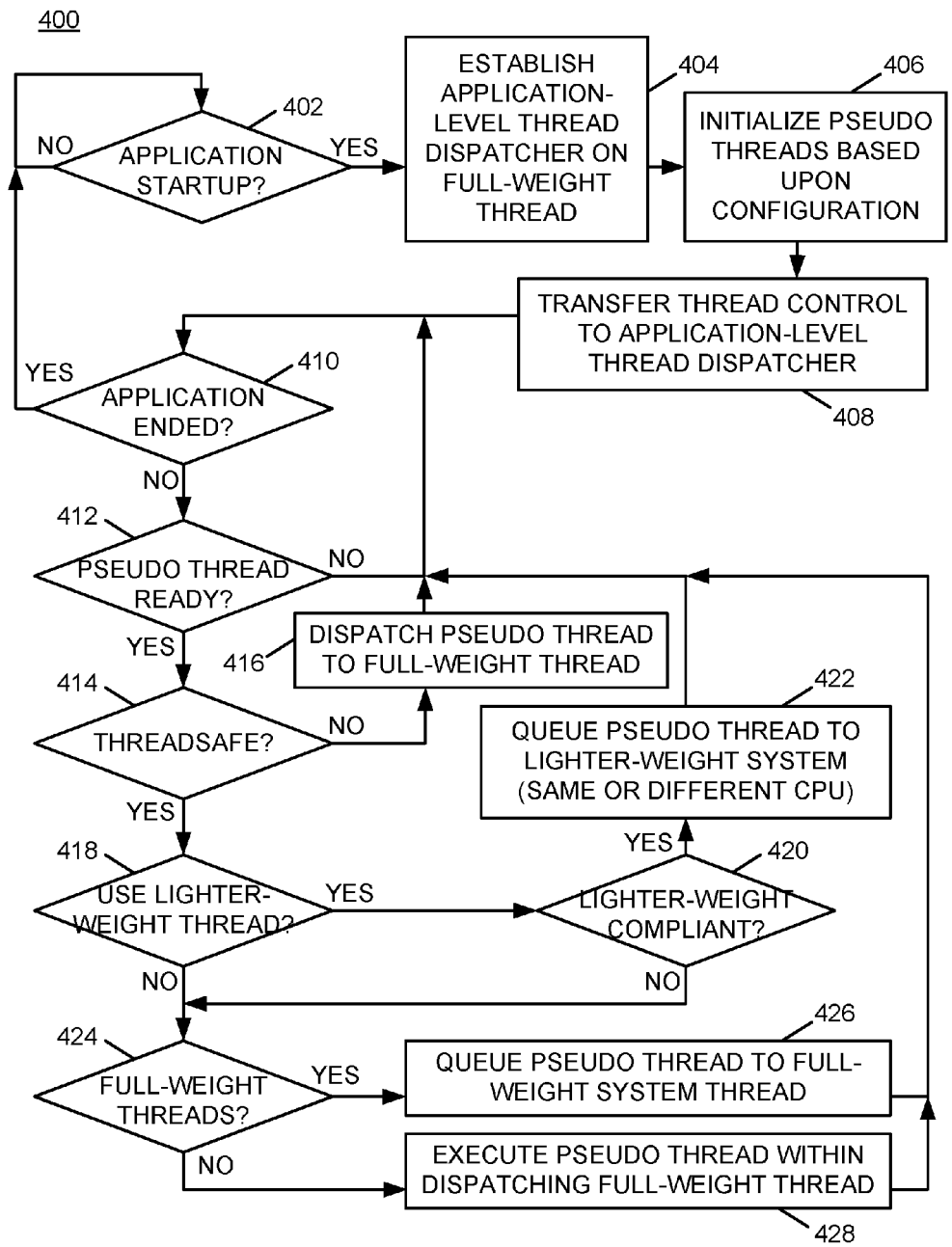
FIG. 4 is a flow chart of an example of an implementation of a process for application-level dispatcher control of application-level pseudo threads, lighter-weight operating system threads, and full-weight operating system threads according to an embodiment of the present subject matter.

FIG. 3 through FIG. 4 described below represent example processes that may be executed by devices, such as the core processing module 100, to perform the automated application-level dispatcher control of application-level pseudo threads and operating system threads associated with the present subject matter. Many other variations on the example processes are possible and all are considered within the scope of the present subject matter. The example processes may be executed by an application-level thread dispatcher, such as the application-level thread dispatcher 202 executed by the CPU 102. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for application-level dispatcher control of application-level pseudo threads and operating system threads. At block 302, the process 300 establishes by a processor, an application-level thread dispatcher that operates in a main full-weight thread allocated to an application. At block 304, the process 300 initializes, by the application-level thread dispatcher, a plurality of application-level pseudo threads that operate as application-controlled threads within the main full-weight thread allocated to the application. At block 306, the process 300 determines, by the application-level thread dispatcher, that at least one application-level pseudo thread meets configuration requirements to operate within a separate operating system-level thread in parallel with the main full-weight thread. At block 308, the process 300 dispatches, from the main full-weight thread by the application-level thread dispatcher in response to determining that the at least one application-level pseudo thread meets the configuration requirements to operate within the separate operating system-level thread in parallel with the main full-weight thread, the at least one application-level pseudo thread to the separate operating system-level thread.

FIG. 4 is a flow chart of an example of an implementation of a process 400 for application-level dispatcher control of application-level pseudo threads, lighter-weight operating system threads, and full-weight operating system threads. At decision point 402, the process 400 makes a determination as to whether an application startup event has been detected. It is understood for purposes of the present example, that the application is designed to implement an application-level thread dispatcher. In response to determining that an application startup event has been detected, the process 400 establishes an application-level thread dispatcher, such as the application-level thread dispatcher 202, on a full-weight system thread at block 404.

The application-level thread dispatcher may have subordinate system threads (e.g., helper system threads such as other full-weight system threads or lighter-weight system threads) that may be available to help the dispatching system thread schedule application-level work. The respective other full-weight system threads or lighter-weight system threads are referred to generally as "helper" threads to reduce complexity of the following description.

At block 406, the process 400 initializes any pseudo threads for the application based upon application configuration parameters. Pseudo threads may be initialized with the application startup and/or may be dynamically added to the application-level thread dispatcher after initialization by the application logic.

When the system thread reaches its "steady state" of processing, the process 400 transfers thread control to the application-level thread dispatcher at block 408. The application-level thread dispatcher is thereafter responsible for what the system thread does until the application-level thread dispatcher is signaled to end (e.g., when the application or system thread is being ended).

The process 400 enters an iterative loop to determine whether the application (or thread) has ended at decision point 410 or whether a pseudo thread is ready (e.g., has been signaled to perform its responsibility) at decision point 412. It is understood that if the application (or thread) has ended at decision point 410, the process 400 will return to decision point 402 and will iterate as described above. Otherwise, the processing iterates as described further below until the application (or thread) has ended.

Each pseudo thread may have properties associated with it that indicate whether the pseudo thread is eligible to run on a helper system thread. There are multiple different points within the process 400 at which such properties are evaluated in association with decisions related to dispatching a pseudo thread to a helper thread.

At decision point 414, the process 400 performs the first property check to determine whether the pseudo thread is thread-safe. In response to determining that the pseudo thread is not thread-safe, the process 400 determines that the pseudo thread must execute on the full-weight dispatching system thread and the process 400 dispatches the pseudo thread to execute on the full-weight dispatching system thread at block 416. The process 400 returns to decision point 410 and iterates as described above.

It should be noted that while the pseudo thread is executing on the full-weight dispatching system thread, the application-level thread dispatcher is unable to dispatch other work. The application-level dispatcher does not regain control until the pseudo thread yields, as described above.

Returning to the description of decision point 414, in response to determining, based upon a given pseudo thread's properties, that the given pseudo thread is thread-safe, the process 400 makes a determination decision point 418 as to whether the pseudo thread has been configured to run with a lighter-weight thread. If the application-level thread dispatcher has been configured to run with lighter-weight system threads (either on the same CPU, another general purpose CPU, or on a thread execution offload processor), then more pseudo thread properties may be examined to determine additional processing.

In response to determining at decision point 418 that the pseudo thread has been configured to run with a lighter-weight thread, the process 400 makes a determination at decision point 420 as to whether the pseudo thread is thread system compliant with respect to requirements of execution within the respective lighter-weight thread system (e.g., whether the pseudo thread meets the requirements of the respective lighter-weight thread system—either on the current CPU or on an thread execution offload processor). In response to determining that the pseudo thread is lighter-weight thread system compliant for the respective lighter-weight thread system, the process 400 queues the pseudo thread to the pool of lighter-weight system threads at block 422 (again on the same CPU or a different CPU). As described above, the queuing of the pseudo thread involves placing work within a queue, such as within the work dispatching queues 118, for which the pseudo thread is responsible to perform, and invoking the lighter-weight system thread to process the work in the queue. As also described above, the application-level thread dispatcher may be able to dynamically increase its number or pool of lighter-weight or full-weight threads (subject to minimum/maximum constraints) to execute the pseudo thread on another system thread rather than use the dispatching thread's resources. As such, part of the processing at decision point 422 is determining whether enough threads exist, and potentially adjusting the respective thread pool size accordingly and within system constraints. The process 400 returns to decision point 410 and iterates as described above.

Returning to the description of decision point 420, in response to determining that the pseudo thread is not lighter-weight thread system compliant for the respective lighter-weight thread system, or in response to determining at decision point 418 that the pseudo thread has not been configured to run with a lighter-weight thread, the process 400 makes a determination as to whether any full-weight system threads were defined for the application at decision point 424. In response to determining that there are full-weight system threads configured for the application, the process 400 queues the pseudo thread to that pool of full-weight system threads at block 426. As described above, the application-level thread dispatcher may be able to dynamically increase its number or pool of lightweight or full-weight threads (subject to minimum/maximum constraints) to execute the pseudo thread on another system thread rather than use the dispatching thread's resources. As such, even for an application with configured full-weight system threads, adjustments to the number of full-weight system threads in the thread pool associated with the application may be made by the process 400. As such, part of the processing at decision point 426 is determining whether enough threads exist, and potentially adjusting the respective thread pool size accordingly and within system constraints. The process 400 returns to decision point 410 and iterates as described above.

Returning to the description of decision point 424, in response to determining that there are not any full-weight system threads configured for the application and that allocation of a full-weight system thread to the application is not possible based upon configuration or current system constraints, the process 400 executes the pseudo thread in the dispatching full-weight system thread as a pseudo thread at block 428. The process 400 returns to decision point 410 and iterates as described above.

As such, the process 400 initiates an application-level thread dispatcher. The application-level thread dispatcher performs determinations of where to execute individual pseudo threads based upon properties associated with the respective pseudo threads and system and configured constraints for lighter-weight thread systems, and queues the pseudo threads to execute on lighter-weight system threads where possible within the respective constraints. The process 400 may also queue pseudo threads to execute on other full-weight threads, again based upon properties associated with the respective pseudo threads and system constraints for full-weight thread systems. The process 400 processes any pseudo threads that are not threads safe within its own full-weight system thread.

As described above in association with FIG. 1 through FIG. 4, the example systems and processes provide application-level dispatcher control of application-level pseudo threads and operating system threads. Many other variations and additional activities associated with application-level dispatcher control of application-level pseudo threads and operating system threads are possible and all are considered within the scope of the present subject matter.

Those skilled in the art will recognize, upon consideration of the above teachings, that certain of the above examples are based upon use of a programmed processor, such as the CPU 102. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
   establishing, by a processor, an application-level thread dispatcher that operates in a main full-weight thread allocated to an application;
   initializing, by the application-level thread dispatcher, a plurality of application-level pseudo threads that operate as application-controlled threads within the main full-weight thread allocated to the application; and
   evaluating, by the application-level thread dispatcher, run-time performance of the application.

2. The method of claim 1, further comprising:
   dispatching, from the main full-weight thread by the application-level thread dispatcher in response to determining that at least one application-level pseudo thread meets configuration requirements to operate within a separate operating system-level thread in parallel with the main full-weight thread, the at least one application-level pseudo thread to the separate operating system-level thread.

3. The method of claim 2, where the separate operating system-level thread comprises one of another full-weight operating system thread and a separate lighter-weight operating system-level thread.

4. The method of claim 3, where, in response to the separate operating system-level thread comprising the separate lighter-weight operating system-level thread, the separate lighter-weight operating system-level thread is executed on a separate thread execution offload processor.

5. The method of claim 2, where work performed by the at least one application-level pseudo thread that is dispatched to the separate operating system-level thread is thread-safe and the at least one application-level pseudo thread performs the thread-safe work within the separate operating system-level thread in parallel with operations performed within the main full-weight thread by the application-level thread dispatcher.

6. The method of claim 2, where:
   dispatching, from the main full-weight thread by the application-level thread dispatcher in response to determining that the at least one application-level pseudo thread meets the configuration requirements to operate within the separate operating system-level thread in parallel with the main full-weight thread, the at least one application-level pseudo thread to the separate operating system-level thread, comprises:
      placing work of the at least one application-level pseudo thread within a work dispatching queue; and
      invoking the separate operating system-level thread to process the work dispatching queue.

7. The method of claim 1, further comprising:
   dynamically adjusting, in response to evaluating the run-time performance of the application, at least one of:
      a quantity of full-weight threads allocated to the application;
      a quantity of application-level pseudo threads allocated to the application; and
      a quantity of lighter-weight operating system threads allocated to the application.

8. A system, comprising:
   a memory; and
   a processor programmed to:
      establish an application-level thread dispatcher that operates in a main full-weight thread allocated within the memory to an application;
      initialize, by the application-level thread dispatcher, a plurality of application-level pseudo threads that operate as application-controlled threads within the main full-weight thread allocated to the application; and
      evaluate, by the application-level thread dispatcher, run-time performance of the application.

9. The system of claim 8, where the processor is further programmed to:
   dispatch, from the main full-weight thread by the application-level thread dispatcher in response to determining that at least one application-level pseudo thread meets configuration requirements to operate within a separate operating system-level thread in parallel with the main full-weight thread, the at least one application-level pseudo thread to the separate operating system-level thread.

10. The system of claim 9, where the separate operating system-level thread comprises one of another full-weight operating system-level thread and a separate lighter-weight operating system-level thread.

11. The system of claim 10, where, in response to the separate operating system-level thread comprising the separate lighter-weight operating system-level thread, the separate lighter-weight operating system-level thread is executed on a separate thread execution offload processor.

12. The system of claim 9, where work performed by the at least one application-level pseudo thread that is dispatched to the separate operating system-level thread is thread-safe and the at least one application-level pseudo thread performs the thread-safe work within the separate operating system-level thread in parallel with operations performed within the main full-weight thread by the application-level thread dispatcher.

13. The system of claim 8, where the processor is further programmed to:
dynamically adjust, in response to evaluating the run-time performance of the application, at least one of:
a quantity of full-weight threads allocated to the application;
a quantity of application-level pseudo threads allocated to the application; and
a quantity of lighter-weight operating system threads allocated to the application.

14. A computer program product, comprising:
a computer readable storage medium having computer readable program code embodied therewith, where the computer readable program code when executed on a computer causes the computer to:
establish an application-level thread dispatcher that operates in a main full-weight thread allocated to an application;
initialize, by the application-level thread dispatcher, a plurality of application-level pseudo threads that operate as application-controlled threads within the main full-weight thread allocated to the application; and
evaluate, by the application-level thread dispatcher, run-time performance of the application.

15. The computer program product of claim 14, where the computer readable program code when executed on the computer further causes the computer to:
dispatch, from the main full-weight thread by the application-level thread dispatcher in response to determining that at least one application-level pseudo thread meets the configuration requirements to operate within a separate operating system-level thread in parallel with the main full-weight thread, the at least one application-level pseudo thread to the separate operating system-level thread.

16. The computer program product of claim 15, where the separate operating system-level thread comprises one of another full-weight operating system-level thread and a separate lighter-weight operating system-level thread.

17. The computer program product of claim 16, where, in response to the separate operating system-level thread comprising the separate lighter-weight operating system-level thread, the separate lighter-weight operating system-level thread is executed on a separate thread execution offload processor.

18. The computer program product of claim 15, where work performed by the at least one application-level pseudo thread that is dispatched to the separate operating system-level thread is thread-safe and the at least one application-level pseudo thread performs the thread-safe work within the separate operating system-level thread in parallel with operations performed within the main full-weight thread by the application-level thread dispatcher.

19. The computer program product of claim 15, where in causing the computer to dispatch, from the main full-weight thread by the application-level thread dispatcher in response to determining that the at least one application-level pseudo thread meets the configuration requirements to operate within the separate operating system-level thread in parallel with the main full-weight thread, the at least one application-level pseudo thread to the separate operating system-level thread, the computer readable program code when executed on the computer causes the computer to:
place work of the at least one application-level pseudo thread within a work dispatching queue; and
invoke the separate operating system-level thread to process the work dispatching queue.

20. The computer program product of claim 14, where the computer readable program code when executed on the computer further causes the computer to:
dynamically adjust, in response to evaluating the run-time performance of the application, at least one of:
a quantity of full-weight threads allocated to the application;
a quantity of application-level pseudo threads allocated to the application; and
a quantity of lighter-weight operating system threads allocated to the application.

* * * * *